INVENTORS.
DARREL G. McCULLOUGH
ROBERT D. TROUSDALE
BY
John A. Duffy
ATTORNEY.

INVENTORS.
DARREL G. McCULLOUGH
ROBERT D. TROUSDALE
BY John A. Duffy
ATTORNEY.

CATHODE RAY TUBE DIGITAL DISPLAY SYSTEM

Filed Aug. 3, 1966 6 Sheets-Sheet 3

INVENTORS.
DARREL G. McCULLOUGH
ROBERT D. TROUSDALE
BY John A. Duffy
ATTORNEY.

| | Z-REGISTER $Z_5 Z_4 Z_3 Z_2 Z_1$ | 1/4 STOP STEPS PULSE DEVIATION NANO SEC. | CAPACITOR IN CIRCUIT | RESISTOR IN CIRCUIT | THRESHOLD LEVEL |
|---|---|---|---|---|---|
| | 0 0 0 0 0 | 3 3 | — | R 4 | 0.84 E |
| | 0 0 0 0 1 | 3 9 | — | R 4 | E |
| | 0 0 0 1 0 | 4 6 | — | R 3 | 0.84 E |
| | 0 0 0 1 1 | 5 5 | C1 — | R 3 | E |
| | 0 0 1 0 0 | 6 5 | ALONE — | R 2 | 0.84 E |
| | 0 0 1 0 1 | 7 8 | — | R 2 | E |
| | 0 0 1 1 0 | 9 2 | — R1 | — | 0.84 E |
| | 0 0 1 1 1 | 1 1 0 | — ALONE | — | E |
| | 0 1 0 0 0 | 1 3 0 | C 2 | R 4 | 0.84 E |
| | 0 1 0 0 1 | 1 5 5 | C 2 | R 4 | E |
| | 0 1 0 1 0 | 1 8 5 | C 2 | R 3 | 0.84 E |
| | 0 1 0 1 1 | 2 2 0 | C 2 | R 3 | E |
| | 0 1 1 0 0 | 2 6 0 | C 2 | R 2 | 0.84 E |
| | 0 1 1 0 1 | 3 1 0 | C 2 | R 2 | E |
| 71— | 0 1 1 1 0 | 3 7 0 | C 2 | — | 0.84 E |
| 72— | 0 1 1 1 1 | ORIGIN— 4 4 0 | C 2 | — | E |
| 73— | 1 0 0 0 0 | 5 2 5 | C 3 | R 4 | 0.84 E |
| | 1 0 0 0 1 | 6 2 5 | C 3 | R 4 | E |
| | 1 0 0 1 0 | 7 4 5 | C 3 | R 3 | 0.84 E |
| | 1 0 0 1 1 | 8 8 5 | C 3 | R 3 | E |
| | 1 0 1 0 0 | 1 0 5 0 | C 3 | R 2 | 0.84 E |
| | 1 0 1 0 1 | 1 2 5 0 | C 3 | R 2 | E |
| | 1 0 1 1 0 | 1 5 0 0 | C 3 | — | 0.84 E |
| | 1 0 1 1 1 | 1 8 0 0 | C 3 | — | E |
| | 1 1 0 0 0 | 2 1 0 0 | C 4 | R 4 | 0.84 E |
| | 1 1 0 0 1 | 2 5 0 0 | C 4 | R 4 | E |
| | 1 1 0 1 0 | 2 9 0 0 | C 4 | R 3 | 0.84 E |
| | 1 1 0 1 1 | 3 5 0 0 | C 4 | R 3 | E |
| | 1 1 1 0 0 | 4 2 0 0 | C 4 | R 2 | 0.84 E |
| | 1 1 1 0 1 | 5 0 0 0 | C 4 | R 2 | E |
| | 1 1 1 1 0 | 6 0 0 0 | C 4 | — | 0.84 E |
| | 1 1 1 1 1 | 7 1 0 0 | C 4 | — | E |

75

FIG. 5.

INVENTORS.
DARREL G. McCULLOUGH
ROBERT D. TROUSDALE
BY John A. Duffy
ATTORNEY.

CATHODE RAY TUBE DIGITAL DISPLAY SYSTEM

Filed Aug. 3, 1966 6 Sheets-Sheet 5

INVENTORS.
DARREL G. McCULLOUGH
ROBERT D. TROUSDALE
BY John A. Duffy
ATTORNEY.

CATHODE RAY TUBE DIGITAL DISPLAY SYSTEM
Filed Aug. 3, 1966 6 Sheets-Sheet 6
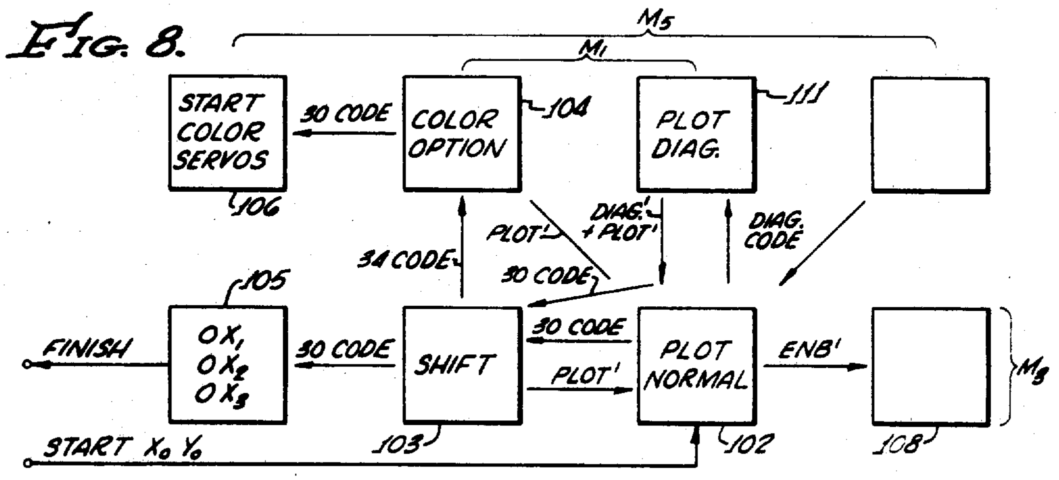
FIG. 8.
FIG. 9.
113
| DIAGONAL PLOT BOX 111 | STRAIGHT CODES 34 | 35 | NULLS | DIAGONAL CODES | INCREMENT TO APPLY TO INTENSITY CONTROL 48 |
|---|---|---|---|---|---|
| 0 | 1 | 0 | 0 | 0 | -1 |
| 0 | 0 | 1 | 0 | 0 | +1 |
| 0 | 0 | 0 | 1 | 0 | 0 |
| 0 | 0 | 0 | 0 | 1 | +2 |
| 112 { 1 | 0 | 0 | 0 | 1 | 0 |
| 1 | 0 | 0 | 1 | 0 | -2 |
| 1 | 1 | 0 | 0 | 0 | -3 |
| 1 | 0 | 1 | 0 | 0 | -1 |
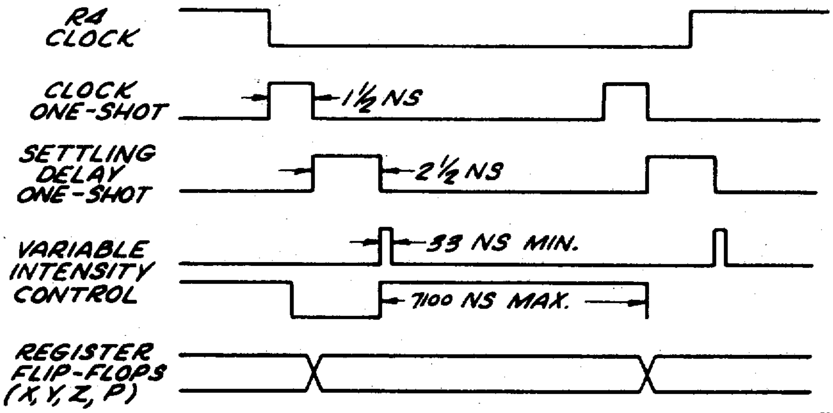
FIG. 10.
INVENTORS.
DARREL G. McCULLOUGH
ROBERT D. TROUSDALE
BY John A. Duffy
ATTORNEY.

United States Patent Office 3,471,847
Patented Oct. 7, 1969

3,471,847
CATHODE RAY TUBE DIGITAL DISPLAY SYSTEM

Darrel G. McCollough, Chino, and Robert B. Trousdale, Santa Ana, Calif., assignors to California Computer Products, Inc., Anaheim, Calif., a corporation of California Filed Aug. 3, 1966, Ser. No. 569,948
Int. Cl. G08b *23/00;* H01j *29/70*
U.S. Cl. 340—324 13 Claims

ABSTRACT OF THE DISCLOSURE

A graphical recording system including a cathode ray tube for providing continuous and discontinuous graphical plots. The electron beam of the cathode ray tube is incrementally moveable along the face of the tube and X and Y axis such that each incremental movement of the beam is initiated from the location of termination of the last previous increment. Means are provided for generating signals to deflect the beam, to select dot positions in differential vector increments such that each incremental movement of the beam is initiated from the location of termination of the last dot position.

This invention relates to systems and devices for digital data processing application, and more particularly to digitally controlled graphical plotting and display systems utilizing cathode ray tubes or other electronic display devices.

Electronic display devices such as cathode ray tubes serve in connection with computer and other digital data processors for indicating the results of the data processor. Such display devices necessarily must be compatible with modern high speed digital computers with high output data rates, and be capable of receiving their input data in the form of the computer output signals.

The modern general purpose digital computer may develop data for complex two-dimensional displays having linear or non-linear bases and requiring both continuous or line presentations and discontinuous data such as numerical and alphabetical characters, identification, symbols and the like. Thus, there is a further requirement placed on an output display device, such as a cathode ray tube, of being able to display data in a continuous and discontinuous presentation.

The known cathode ray tube display systems operate with digital data processing systems to display information on the face of the tube in several well known ways. In one type, a shaped electron beam is generated by the electron illumination of a mask inside the cathode ray tube. The mask is provided with a plurality of apertures, each having the shape of a different letter or number, and by directing an electron beam onto the mask from the electron gun a shaped beam is provided. By the use of a deflection system the shaped beam is positioned on the screen as required. A second type, similar to television, exists in which a scanning raster is formed at a desired position on the screen and the tube is unblanked to form a character composed of line segments in a manner similar to the compositions of a television picture. A third type of unit exists wherein an electron beam is first positioned to a reference point and then is caused to trace out the character through the application of the X and Y component functions to a microdeflection system.

All of these prior art cathode ray tube display systems function to either provide all of the discontinuous elements of information such as an alphabetical or numerical character, or to produce information in a continuous graph form. Accordingly, it may be seen that prior art cathode ray tube display systems have not realized the flexibility and compatability for producing a graphical display of information in a digital computer to provide a complete display with both continuous and discontinuous type information.

An attempt has been made in prior art devices such as the Stromberg Carlson Type No. 4020 to produce a complete graphical display system for displaying the information of a digital data processor. Systems like the 4020 do provide this information, but are extremely complicated and expensive. Such systems require relatively complex character generating circuits for each different character to be displayed, in addition to requiring complex and precision circuitry for producing continuous data such as lines. Accordingly, it is an object of this invention to provide an improved cathode ray tube display device for graphically displaying information from a digital data processor.

The device of this invention provides the versatility and reliability compatible with that of the high speed advanced digital computer systems as well as adequate speed. The versatility of the display system includes the ability to present completely arbitrary continuous as well as discontinuous data, both in the form of line plotting as well as random symbol printing, and to present the data in widely varying form and sizes.

A particular feature of this invention is to provide a system which is wholly compatible with the modern day digital computers.

It is therefore, another object of this invention to provide an improved system for digital data processors, which system provides a combination of versatility, speed and reliability not heretofore attained in graphically displaying the output of a digital data processor on a cathode ray tube display device.

Another object of this invention is to provide an improved graphical display system utilizing a cathode ray tube display device capable of operating in response to stored digital data to provide both continuous and discontinuous display information.

Still another object of this invention is to provide an improved cathode ray tube display system for presenting graphic records from stored digital data.

A still further object of this invention is to provide an improved cathode ray tube display system for displaying information in the form of intermixed line segment plots and arbitrary symbols, and with the capability of random selection of the symbols.

These and other objects of systems in accordance with the present invention are achieved through the advantageous use of a high speed, incrementally controlled graphical display system utilizing a cathode ray tube. This system is operated under the control of differential vector increment digital data derived either directly from a data processing system or from a cooperating subsidiary data storage. A series of differential vector increment digital-signals control the sequence of movements of the cathode ray tube electron beam in each of the normally orthogonal directions, while a third digital signal controls the blanking and unblanking of the beam, with the beam being stepped from point to point at high speed with very small incremental movements, producing a series of individual, sharply defined dots which may blend together to provide the desired display. A substantially continuous presentation or discontinuous symbols, marks or characters may be formed or a combination of these may be supplied on the face of the cathode ray tube.

A better understanding of the invention may be had with reference to the following description written in conjunction with the accompanying drawings in which:

FIGURE 1*a* illustrates the face of a cathode ray tube showing a typical display of continuous and discontinuous data in accordance with the invention;

FIGURE 1*b* is a diagram of a particular part of the display of FIG. 1*a* in greatly enlarged scale illustrating the manner of dot increment plotting;

FIGURE 5 is a table illustrating in tabular form the pulse duration of the signal unblanking the electron beam;

FIGURE 8 is a digital Veitch diagram illustrating the operating of the mode control circuit of FIG. 2; and FIGURE 9 illustrates in tabular form the control of the intensity of the electron beam; and FIGURE 10 is a display of typical waveforms utilized in the system of FIG. 2.

According to a principal aspect of the invention, a display system including a cathode ray tube provides continuous and discontinuous graphical plots. The system includes a cathode ray tube with X and Y deflection means for deflecting an electron beam on the tube along X and Y orthogonal axes, the beam being incrementally movable along the face of the tube in the X and Y axes such that each incremental movement of the beam is initiated from the location of termination of the last previous increment of the beam relative to the face of the tube. Means are provided for generating signals to deflect the electron beam to selected dot positions in differential vector increments such that each incremental movement of the beam is initiated from the location of termination of the last previous dot position relative to the face of the tube along the X and Y axes.

More particularly, the apparatus for generating signals to deflect the electron beam in an incremental manner to selected dot positions comprises a pair of resistor ladder networks responsive to digital coding for coupling the resistors to the cathode ray tube deflection means.

GENERAL DESCRIPTION OF CATHODE RAY TUBE DISPLAY SYSTEM

Figure 1A:
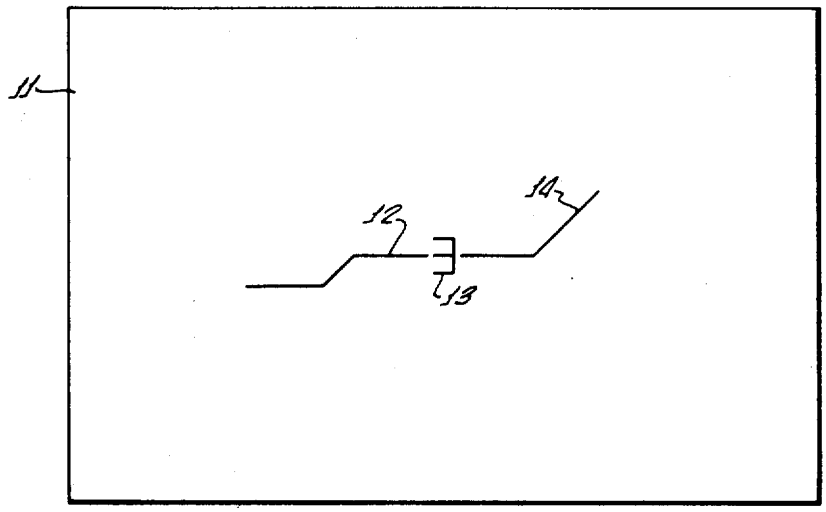

Referring now to a detailed discussion of the drawings, FIG. 1*a* shows the face 11 of a standard cathode ray tube. Upon application of input signals to the device of the invention from a digital data processor, such as a general purpose digital computer, a graphical display will appear on the face 11 of the tube shown to include typically, as for example, the line 12, the numerical character 3 (designated 13) and the line 14. The display is formed by a series of differential vector increment digital signals which control sequence of movements of the electron beam of the cathode ray tube in each of two independent, normally orthogonal directions, while a third digital signal controls the blanking and unblanking of the electron beam to form a series of dots. Thus, the electron beam is stepped from point to point at high speed with very small incremental movements so that a substantially continuous presentation such as the line 12 or discontinuous lines such as 12, character 13, may be formed or a combination of these may be supplied. The size of the dots formed on the face 11 and minute distances therebetween cause the display, such as the line 12 and the numeral designated 13, to appear as unbroken lines to the viewer. In a specific example, the face 11 has dimensions of 5" by 7.7" with 1700 spots available along the 7.7" dimension and 1100 spots along the 5" dimension.

Figure 1B:
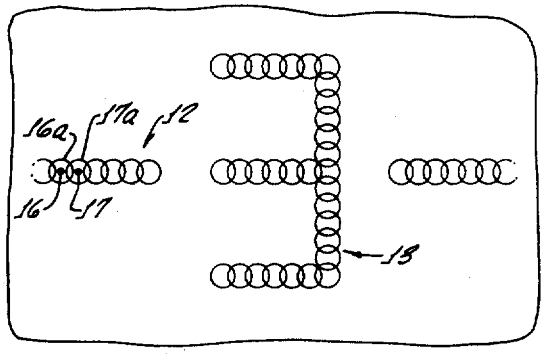

Referring now to FIG. 1*b*, which is a greatly enlarged view of a portion of the face 11 of FIG. 1*a*, there is illustrated how the display on the face of the tube 11 is formed by a series of dots. Thus, starting from any arbitrary center point such as 16, the electron beam, after receiving a command to unblank and form the first dot **16*a*, is deflected to the next position indicated by the point 17, at which point upon an unblanking signal the dot 17*a* is formed on the face 11. Continuing, a series of dots 19 are formed which correspond to the edge of the line 12** in FIG. 1*a*. Thus it may be seen from the enlarged portion of FIG. 1*b* that a series of overlapping dots or circles are displayed on the face 11 and which appear to the viewer as shown in the display of FIG. 1*a*.

A particular feature of the invention as seen in FIGS. 1*a* and 1*b* resides in the control of the sequence of movements of the electron beam so that the beam is moved in each of the two normally orthogonal X and Y directions, while a third digital signal controls the blanking and unblanking of the beam from point to point, such as from point 16 to point 17 of FIG. 1*b*, so that a substantially continuous presentation, such as the line 12, or discontinuous, such as a combination of the line 12, numerical character 13, and the line 14, may be displayed.

Another important feature of the invention is that each dot is derived from the location of the last dot. Thus, dot **17*a* is derived from dot 16*a***. This feature greatly enhances reliability and efficiency. In effect, data is displayed on the face of the cathode ray tube in a step by step fashion which is especially compatible with the digital data format in digital computers and on magnetic tape.

Figure 2:
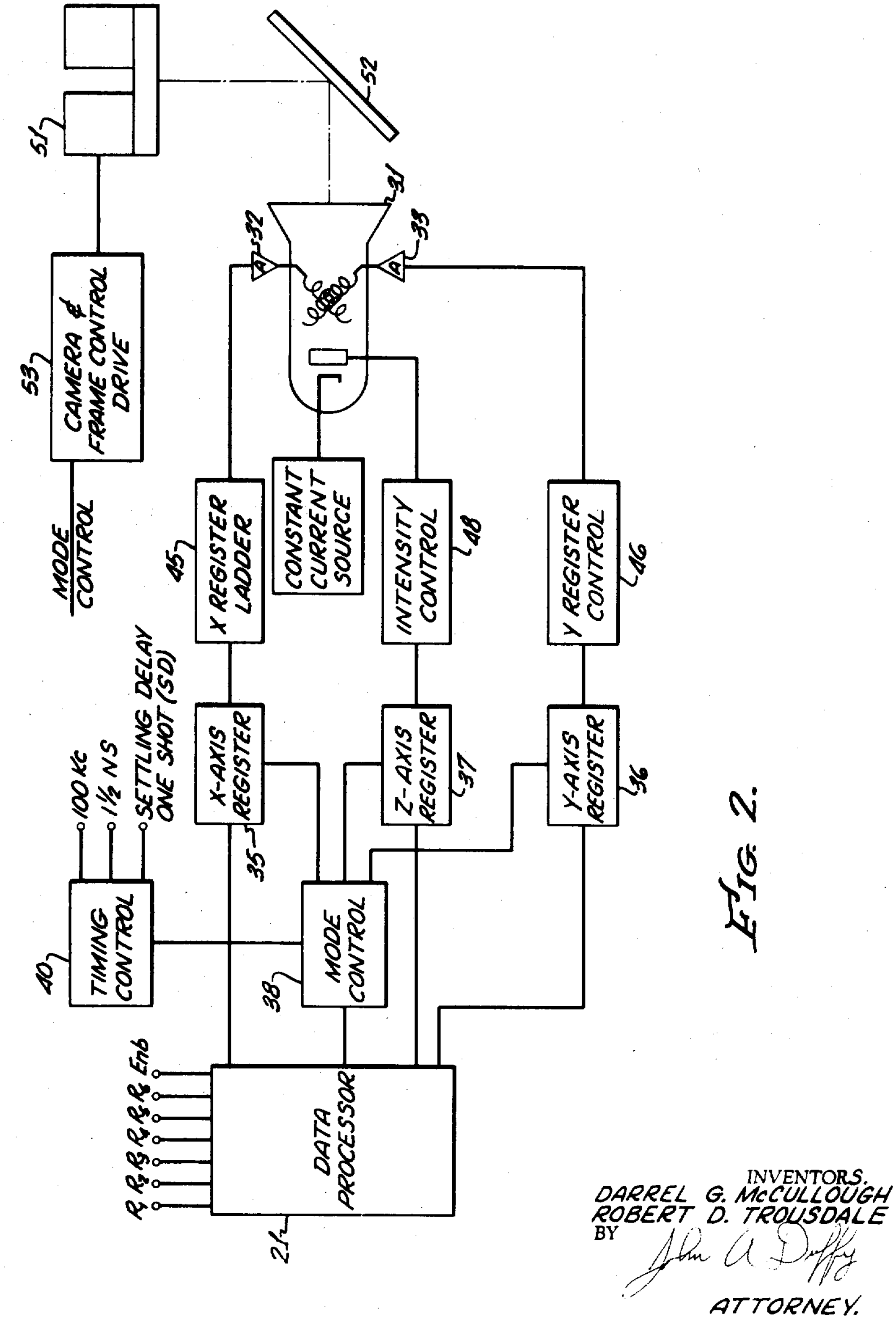
FIGURE 2 is a schematic block diagram illustrating the components and functional relationships in a preferred embodiment of the invention.

Referring now to FIG. 2, there is illustrated in block form the cathode ray tube graphical display system in accordance with a preferred aspect of the invention. In FIG. 2 a data processor 21 may be a general purpose digital computer or a magnetic tape unit suitable for providing digital information for generation of graphical plots to be displayed on the face of a cathode ray tube 31. The cathode ray tube 31 is a standard tube having an electron beam controlled in X and Y directions by horizontal and vertical deflection currents applied through respective deflection amplifiers 32 and 33. Amplifiers 32 and 33 are designed in such a way as to provide a lineal relationship between input deflection voltage and output deflection current, typically mechanized through use of current-sensing feedback means well known in the cathode ray tube art. The electron beam of the tube 31 is controlled in intensity to blank and unblank by intensity control 48 and includes a constant current source along with other controls typical of cathode ray tubes.

Digital command signals from the data processor 21 represented by way of example by the outputs R1 R2 R3 R5 and R6 and ENB are fed to the system of FIG. 2 which, in response to each command signal, deflects the beam of the tube 31 on the face 11 in the manner described in relation to FIGS. 1*a* and 1*b*. The exact coding of the output signals from the data processor 21 need not be described here since it is well known in the art and the coding may be as described, as for example, in Patent No. 3,199,111, for a Graphical Data Recorder System, of Aug. 3, 1965. Typically, in a magnetic tape system each character may have five tape channels for providing one command signal, that is, the particular coding of the output signals R1, R2, R3, R5 and R6 provides one increment command to deflect the electron beam on the face 11 and the proper X–Y direction to provide one increment or step movement of the beam.

The output signals from the data processor 21 are provided to X axis register 35, Y axis register 36 and Z axis register 37 along with the mode control 38. The timing control 40 provides the proper timing to each of the X, Y and Z registers and the mode control 38. The X and Y registers 35 and 36 basically count up and down for each of the character outputs from the data processor 21 and provide digital signals to X and Y resistor ladders 45 and 46 which are essentially digital to analog converters and provide analog voltages of proper magnitude to deflection amplifiers 32 and 33 to position the electron beam in the X and Y directions in accordance with the command signals from the data processor 21. The electron beam is blanked and unblanked to display dots as hereinbefore described in FIGS. 1*a* and 1*b* by command signals from the data processor 21 to the Z axis register 37 which provides digital signals to an intensity control 48 which decodes and converts the signals to provide blanking and unblanking signals to the cathode ray tube 31. Additionally, the intensity control 48, in accordance with command signals from the data processor 21 and control from mode control 38 fed to the Z axis register 37, varies the intensity of the beam on the face 11, in a manner to be more fully described hereinafter. The image on the face 11 of the tube 31 may be photographed in a standard fashion such as, for example, by a camera 51 operating through a mirror system 52, the camera 51 being controlled by a camera frame advance drive 53 in response to the mode control 38. Thus, in effect, digital incremental command signals from the data processor 21 are plotted or displayed on the face 11 of the cathode ray tube 31 with the camera 51 photographing the image on face 11 in a standard manner.

Figures 3, 4:
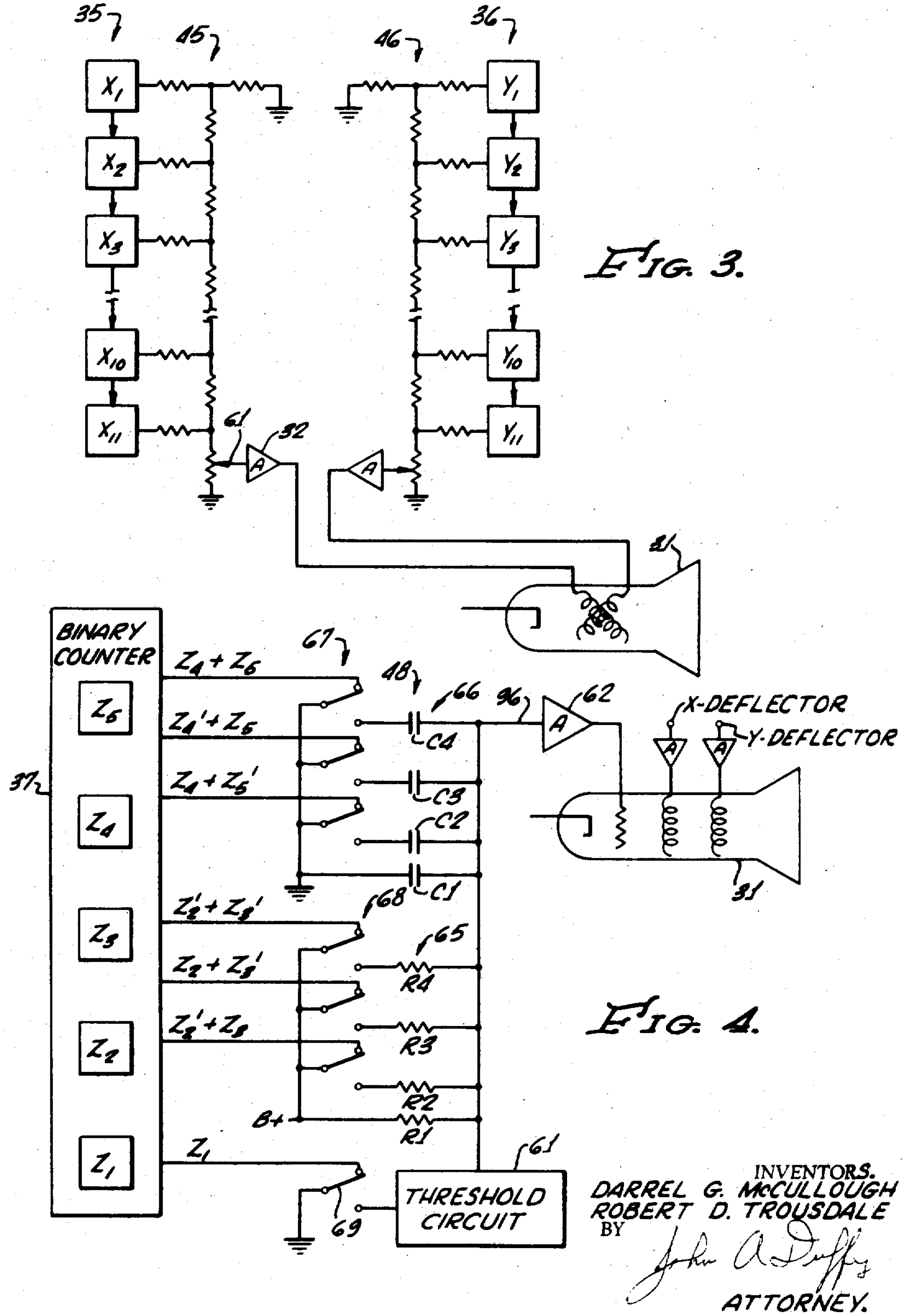
FIGURE 3 is a schematic block diagram of the resistor ladder network utilized to provide the X and Y deflection voltages for deflecting the electron beam on the cathode ray tube.
FIGURE 4 is a schematic block diagram illustrating the variable intensity control circuit for controlling the intensity of the electron beam on the face of the cathode ray tube.

Referring now to FIG. 3, there is illustrated in part block, part schematic diagram, the operation of the X axis register and X resistor ladder along with the Y axis register and Y resistor ladders of FIG. 3. The X axis register 35 has, for example, 11 counter stages, XI through X11, with the range over the face 11 of the cathode ray tube 31 being up to 2048 increments. It is realized, of course, that the number of increments in the X and Y direction and number of stages in the registers 35 and 36 are a matter of choice with a larger number of increments increasing the resolution and a smaller number increasing the speed of display. The X axis register 35 and Y axis register 36 along with accompanying ladder networks are identical. The X axis register 35 is basically an 11 stage counter, counting up one count in response to a +X command from the data processor 21, and counting down one count in response to a −X command from the data processor 21. The X resistor ladder network 45, having resistors connected to the outputs of each of the counters of the register counter 35 provides an output voltage on the line 61 to the deflection amplifier 32 which varies by inrcements in accordance with the variants of the count of the X register 35 with the amplifier 32 providing a control signal to deflect the electron beam of the cathode ray tube 31 in the x direction one increment in accordance with the count of the X register 35. Similarly, the Y axis register 36 and resistor ladder 46 control the Y deflection amplifier, provide a signal to control the deflection of the beam in the Y direction. By deflecting the electron beam one increment at a time along either the X or Y axis or simultaneously along both axes, graphical display in a continuous as well as a discontinuous presentation is achieved.

VARIABLE INTENSITY CONTROL

Referring now to FIG. 4, there is illustrated in schematic block form the system of the invention for controlling the blanking and unblanking of the electron beam of the cathode ray tube 31, in addition to the means for controlling the intensity of the beam. In FIG. 4, the Z axis register 37 comprises a binary counter, illustrated for example with five stages, which is responsive to the mode control 38 and the data processor 21 of the system of FIG. 2. The Z register 37 is connected to control the intensity control 48 which essentially comprises a resistor capacitor network and a threshold circuit 61 for applying a blanking voltage to the cathode ray tube 31. Basically, the variable intensity control 48 in FIG. 4 responsive to the count in the register 37 provides a pulse through an amplifier 62 to unblank the electron beam of the cathode ray tube 31, the duration of the pulse is in accordance with the count in the Z register 37. Resistor circuits 65 and capacitor circuits 66 in combination with a threshold circuit 61 operate to vary the duration of the pulse fed through the amplifier 62. Switches 67 for connecting the capacitor circuit 66 between circuit point 96 and ground, and switches 68 for connecting the resistor circuit 65 between circuit point 96 and ground, control the number of resistors and capacitors in series between B+ and ground at any one time with the switches 67 and 68 responsive to the output of the register 37. A variable pulse width at the input of amplifier 62 is derived by the selective connection of resistor circuit 65 to B+ and capacitor circuits 66 to ground in addition to the connection of the threshold 61 to ground. Thus, for example, should the register 37 operate to close the switch connecting capacitor C4 in circuit to ground and resistor R4 in circuit to B+ and the threshold circuit 61 through the switch 69 to ground, then a resistor capacitor timing circuit comprising C4, R4 and threshold circuit 61 will then provide a pulse to the amplifier 63, the duration of the pulse being determined by the value of capacitor C4, resistor R4 and the bias level of threshold circuit 61. The duration of the pulse unblanking the electron beam of the cathode ray tube 31 determines the apparent diameter of the dot which is displayed on the face 11 and recorded on the photographic film, since the duration of the electron beam on the face varies the film exposure time and hence the image density. Due to blooming effects on the tube face and in the photographic emulsion, an apparent variation in recorded dot diameter is the end result.

Referring now to FIG. 5, taken in conjunction with the diagram of FIG. 4, FIG. 5 illustrates in tabular form the pulse duration of the signal set to unblank the electron beam of cathode ray tube 31 in accordance with the count in the Z register circuit 37. The switches 67, 68 and 69 responsive to the count in the Z register 37 (as illustrated in FIG. 4 by the logic output terms for the Z register) selectively apply voltages to the amplifier 62 in accordance with the Z register 37 count. Thus, for example, if the Z register count is 01111, as illustrated in the table of FIG. 5 at row 71, in the circuit of FIG. 4 capacitor C2 and resistor R1 are in circuit with the threshold circuit 61. This particular circuit provides a voltage through the amplifier 62 to unblank the electron beam of the cathode ray tube 31 for a duration of 440 ns. (nanoseconds). A one-count below the count of the Z register as illustrated in row 71 changes the duration by a predetermined prescribed amount.

The amount of change of pulse duration in accordance with a one step change in count of the Z register 37 is according to a geometric scale. That is, for every addition of one count to the Z register 37, the pulse duration changes by an amount equal to the fourth root of $2(\sqrt[4]{2})$ times the previous amount. Thus, beginning with the row 71 with a pulse duration equal to 440 nanoseconds, if the count changes by one, to count 10000 in row 72, the pulse duration changes to 525 nanoseconds, which is equal to the fourth root of 2 times 440 $(400\sqrt[4]{2})$. Thus, it may be seen in FIG. 5 that going from row 71 to row 72 the threshold circuit 61 of FIG. 2 is changed by switching the switch 69 which provides an increment equal to the fourth root of 2 times a previous pulse duration. Going from the pulse duration 525 of row 72 to pulse duration 625 of row 72, capacitor C2 is replaced by capacitor C3 which again adds a factor of the fourth root of 2 times the previous pulse duration. In this manner the pulse duration in nanoseconds in the column 75 increases by the fourth root of 2 for each incremental increase of one in the Z register. Thus, for example, an increase of two steps in the count of the Z register would increase the pulse duration by the square root of 2. As is well known in the photographic art, increasing or decreasing the pulse duration for unblanking the electron beam geometrically correspondingly varies the exposure time of the film emulsion in terms of "stops" which causes a linear variation in film density and causes a variation in the size of the dot being displayed on the face of the cathode ray tube as finally recorded on film. In this manner, the intensity of the electron beam of the display on the face 11 may be varied in accordance with the digital control provided by the Z register 37.

Figure 6:
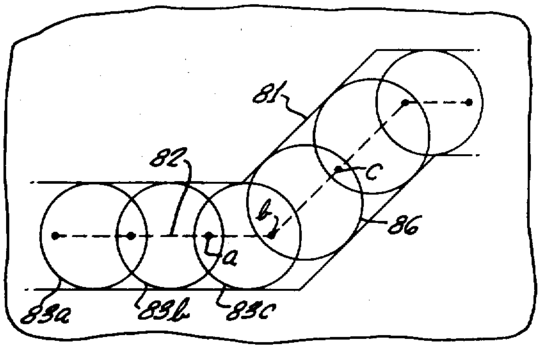
FIGURE 6 illustrates in greatly enlarged scale the manner of providing varying intensity on the face of the cathode ray tube.

An example of the use of the variable intensity control for controlling the intensity of the electron beam may be illustrated in FIG. 6, which shows a greatly enlarged portion of the face 11 of the cathode ray tube 31, wherein a line indicated at 81 is displayed in accordance with the invention by unblanking the electron beam at each of the positions indicated, for example, by *a* and *b* on the dashed line 82. The dots or circles as shown in the enlarged view of FIG. 6 overlap and have a diameter directly corresponding to the pulse duration of the signal for controlling the unblanking of the beam. Thus the circle 83*a* may have a diameter corresponding to the pulse duration of 440 nanoseconds as shown in the row 71 of FIG. 4*b*, and the circles 83*b* and 83*c* would have an equal intensity. However, going from the point *b* on the dashed line 82 to the point *c* which is a 45 degree angle, a distance of $\sqrt{2}$ times the previous incremental distance between *a* and *b* is transversed by the beam. That is, in accordance with the invention, increments are plotted in which 45 degree increments are equal in distance to $\sqrt{2}$ times a straight line increment distance. In FIG. 6, the distance of the increment *bc* is equal to $\sqrt{2}$ times the distance of the increment *ab*. In order to provide a corresponding equal intensity for the line segment *bc* as for *ab*, the circle 86 is generated by the electron beam having an intensity equal to $\sqrt{2}$ times the intensity of the beam when the circles 83*a*, 83*b*, and 83*c* are generated. This is accomplished by controlling the Z register (from the mode control circuit 38) to add two counts to the Z register thereby applying a pulse duration to unblank the beam for 625 nanoseconds in accordance with the row 73 of FIG. 5. A pulse duration of 625 nanoseconds provides a circle having a diameter of that of circle 86. In this manner, a uniform intensity control is provided for all line segments, whether straight line segments or diagonal segments.

The normal intensity control may be selected by setting the Z register originally at any of the counts to provide a varying intensity control. Thus, for example, in FIG. 5 any of the pulse durations in column 75 may be utilized to provide normal intensity. It has been observed that a uniformly variable gray scale is obtained in accordance with the change in count of the Z register 37. Additionally, as described in relation to FIG. 6, a uniform line intensity is realized by increasing the exposure time for lines at 45° to the X or Y axis.

Figure 7:
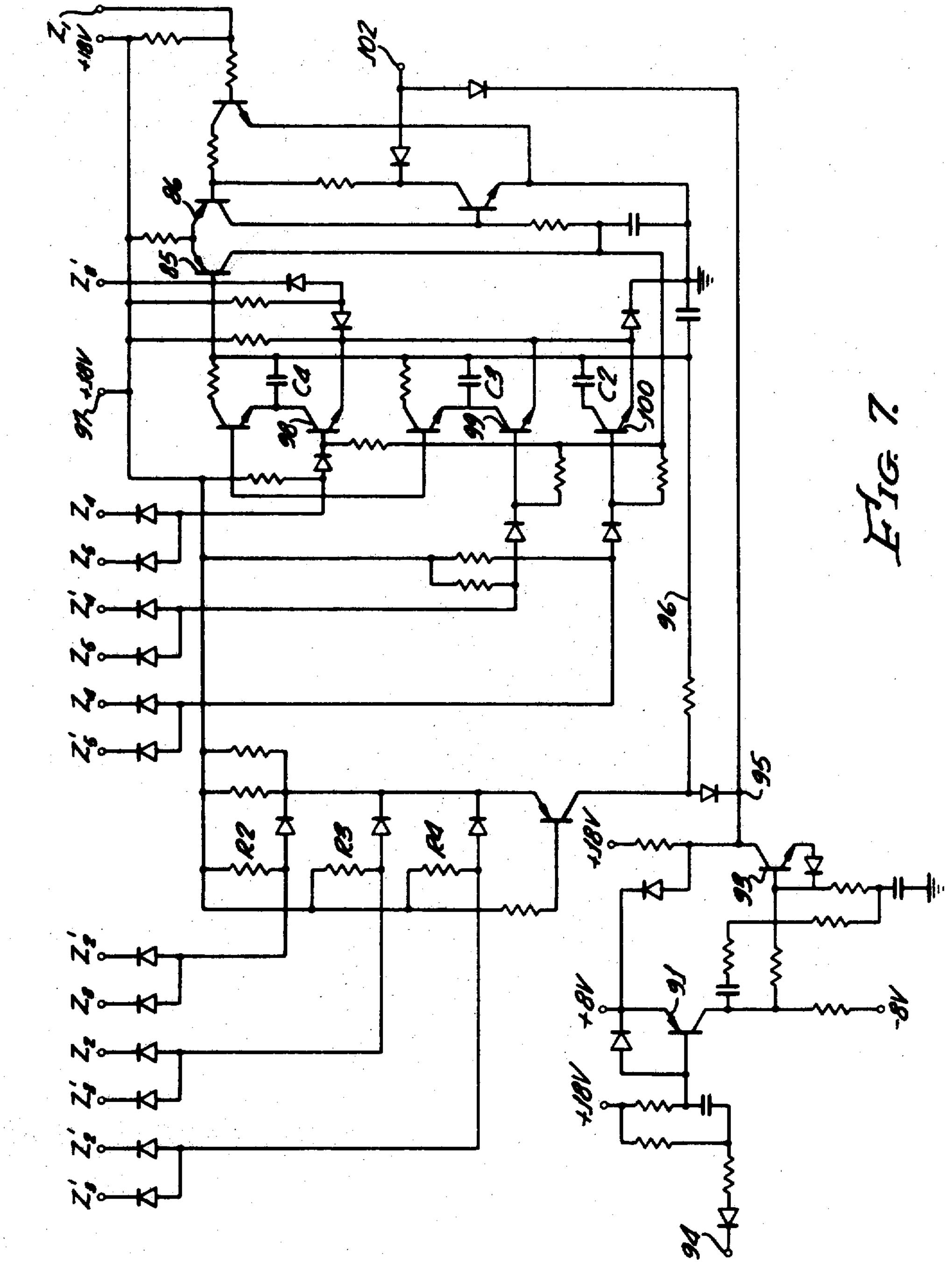
FIGURE 7 is a circuit diagram of the intensity control circuit of FIG. 4.

Referring now to FIG. 7, there is illustrated a schematic circuit diagram for providing the intensity control illustrated in FIG. 4. In FIG. 7 the threshold circuit 51 comprises a pair of transistors 85 and 86 connected to receive a Z1 signal (at the terminal Z1). Resistors R1, R2, R3, R4 are connected as shown to receive the output of the Z register and the capacitors C1 through C4 are connected similarly. A trigger circuit including transistors 91 and 93 is controlled by an input pulse applied to a terminal 94. Transistor 93 conducts upon application of a pulse at terminal 94, completing a circuit from point 95 to ground, which in turn grounds the circuit point 96. The selective application of levels from the Z register 37 (in FIG. 4) at the Z terminals illustrated in FIG. 7 provide the corresponding circuits from the B+ terminal 97 through the resistors R1, R2, R3 and R4 to circuit point 96. Similarly, levels from the Z register at the Z terminals connected to the control bases of the transistors 98, 99 and 100 provide circuits for circuit point 96 through the capacitors C1, C2, C3 and C4 to ground. The output terminal 102 presents a voltage to the amplifier 62 of FIG. 4 in accordance with the count in the Z register 37.

MODE CONTROL

Referring again to FIG. 2 taken in conjunction with FIG. 8 a Veitch diagram illustrates the control of the system from the mode control circuit 31 of FIG. 2. The Veitch diagram of FIG. 8 taken in conjunction with logic equations to be provided hereinafter illustrates the complete digital control of the system. Such Veitch diagrams and logical equations are known in the art and are illustrated, for example, in Patent No. 3,199,111, Graphical Data Recorder System, issued Aug. 3, 1965. The mode control 38 responsive to timing control 40 operates to provide control of the command signals from the data processor 21 through the X, Y and Z axis registers with the plot commands finally displayed on the face of the cathode ray tube 31. The mode control 38 includes in the illustrated embodiment of FIG. 2, five flip-flops M1, M2, M3, M4 and M5. The complete logic equations for the flip-flops M1 through M5 are as follows:

```
1M1=M5' M3 X11
    +M2┌M5' X3 Y2     ┐
       └+M3 M5 AF'    ┘
    +M5 M4' M3' M2P
    +M4A┌M3 X0 Y0          ┐
        │+M3' XMAX' Y0     │
        └+M3' X0 YHALF     ┘

0M1=M5' M3' X0
    +PLOT M2 R5 R3' R21Z
    +M51 M4' M3 M2P FA' F ENB'
    +M4A┌M51 M3 X0' WMAX ┐
        └+M3' Y0' XMAX    ┘

1M2=M5' M4A X000'
    +M5 M4' M31P
    +PMR5 R3' R21Z

0M2=M3' M1' [SERVO COMPLETE]
    +M51 PLOT'
    +M4A S2L'

1M3=M51 M4' PLOT'
    +M4' M2P M1'
    +PMR5
    +PLOT M2P R1'
     M4A┌M1 Y0 XMAX          ┐
        │+M1' XMAX YHALF     │
        └+M1' X0 Y0          ┘

0M3=PLOT M2 R5 R32P R1'
    +PMR5P M2P R1
    +M51 M4A 20 YMAX
    +M4A M1' YMAX XHALF
    +M4A M1' Y0' X0

1M4=M5' M2 M1 S2L
    +M51 M3 M2P ENB' CAL FA

0M4=M5' M2P
    +M31P X0 Y0

1M5=X0 Y0 [M4' M3 M2P M1]

0M5=M31P M2
```

PLOT NORMAL MODE CONTROL

Referring to the Veitch diagram of FIG. 8, initially, operation commences in the Plot Normal Mode Control block 102. In the Plot Normal Mode the mode control flip-flops are in the condition M1 M2' M3 M4' M5. The X and Y registers 35 and 36 are receiving commands from the data processor 21 controlling the direction of the electron beam accordingly. The Z register controls the intensity control 48 to provide a single predetermined level intensity control to the beam.

PLOT DIAGONAL MODE

A diagonal code from the data processor 21 shifts the control to the plot diagonal block 111. In this block the intensity control 48 provides signals for unblanking the electron beam and adjusting the intensity control upward by two steps thereby to increase the diameter of the plotted dots by $\sqrt{2}$. As shown in the table of FIG. 9, when switching into or out of the Plot Diagonal Mode (rows 112 in the column designate Diagonal Plot Box) two increments are added or subtracted to the intensity control 48 as illustrated in the column 113. In the Plot Diagonal Mode 111 the mode control flip-flops are in the condition M1 M2′ M3′ M4′ M5. Control is shifted to the Plot Normal block 102 upon receiving a digital code other than a diagonal movement. Programmed intensity changes may be introduced by use of codes 34 (−Z) or 35 (+Z) while in either box.

SHIFT MODE

Action is shifted from the Plot Normal mode 102 to the shift mode 103 upon application of a 30 code (logic condition PM R5 R3′ R21Z). In the shift mode the operator may continue to the Color Option Mode 104 or to Mode 105 and to Finish Terminal 107.

OPERATION OF THE X, Y AND Z REGISTERS

The X, Y and Z registers, in response to the mode control 38 provide the command signals to the cathode ray tube 31. The complete logic equations for the X axis register are as follows:

1X1=UPX
+DNX

0X1=UPX
+DNX
+M5 M31P M2

1X2=UPX X1
+DNX X1′

0X2=UPX X1
+DNX X1′
+M5 M31P M2

1X3=UPX X2 X1
+DNX X000-

0X3=UPX X123-
+DNX X2′ X1′
+M5 M31P M2

1X4=UPX X123-
+DNX X000

0X4=UPX X123-
+DNX X000

1X5=UPX X4 X123-
+DNX X4′ X000

0X5=UPX X4 X123-
+DNX X4′ X000

1X6=UPX X5 X4 X123-
+DNX X5′ X4′ X000

0X6=UPX X5 X4 X123-
+DNX X5′ X4′ X000

1X7=DNX XK77-
+DNX XK00-

0X7=DNX XK77-
+DNX XK00-

1X8=DNX X7 XK77-
+DNX X7′ XK00-

0X8=DNX X7 XK77-
+DNX X7′ XK00

1X9=DNX X8 X7 XK77-
+DNX X8′ X7′ XK00-

0X9=DNX X8 X7 XK77-
+DNX X8′ X7′ XK00-

1X10=DNX X789- XK77-
+DNX X789Z- XK00-

0X10=DNX X789- XK77-
+DNX X789Z XK00-

1X11=DNX X10 X789- XK77-
+DNX X10′ X789Z XK00-

0X11=DNX X10 X789- XK77-
+DNX X10′ X789Z- XK00-

1X12=DNX X11 X10 X789- XK77-

0X12=DNX X11′ X10′ X789Z- XK00-

The complete logic equations for the Y axis register are as follows:

1Y1=UPY
+DNY

0Y1=UPY
+DNY

1Y2=UPY Y1
+DNY Y1′

0Y2=UPY Y1
+DNY Y1′

1Y3=UPY Y1 Y2
+DNY Y123Z-

0Y3=UPY Y123-
+DNY Y1′ Y2′

1Y4=UPY Y123-
+DNY Y123Z

0Y4=UPY Y123-
+DNY Y123Z-

1Y5=UPY Y4 Y123-
+DNY Y4′ Y123Z-

0Y5=UPY Y4 Y123-
+DNY Y4′ Y123Z-

1Y6=UPY Y5 Y4 Y123-
+DNY Y5′ Y4′ Y123Z-

0Y6=UPY Y5 Y4 Y123-
+DNY Y5′ Y4′ Y123Z

1Y7=DNY YK77-
+DNY YK00-

0Y7=DNY YK77-
+DNY YK00-

1Y8=DNY Y7 YK77-
+DNY Y7′ YK00-

0Y8=DNY Y7 YK77-
+DNY Y7′ YK00-

1Y9=DNY Y8 Y7 YK77-
+DNY Y8′ Y7′ YK00-

0Y9=DNY Y8 Y7 YK77-
+DNY Y8′ Y7′ YK00-

1Y10=DNY Y789- YK77-
+DNY Y789Z- TK00-

0Y10=DNY Y789- YK77-
+DNY Y789Z- YK00-

1Y11=Y10 Y789- YK77-
+Y10′ Y789Z- YK00-

0Y11=Y10 Y789- YK77-
+Y10′ Y789Z- YK00-

1Y12=Y11 Y10 Y789- YK77-

0Y12=Y11′ Y10′ Y789Z- YK00-

The complete logic equations for the Z axis register are as follows:

1Z1=PM R5 R32P
+M31P

0Z1=PMR5 R32P

1Z2=UPZ
+DNZ
+M31P

0Z2=UPZ
+DNZ

1Z3=UPZ Z2
+DNZ Z2′
+DN3Z Z1′
+M31P

0Z3=UPZ Z2
+DNZ Z2′
+DN3Z Z1′

1Z4=UPZ Z2 Z3
+Z3′ [DNZ Z2′ +DN3Z Z1′]
+M31P

0Z4=UPZ Z2 Z3
+DNZ Z2′ Z3′
+DN3Z Z1′ Z3′

1Z5=UPZ Z234
+Z4′ [DNZ Z2′ Z3′ +DN3Z Z1′ Z3′]

0Z5=UPZ Z234-
+Z3′ Z4′ [DNZ Z2′ +DN3Z Z1′]
+M31P

Referring now to FIG. 10, there is illustrated the timing diagrams provided by the timing control 40 of FIG. 2. Initially, timing is derived from a clock pulse from the data processor 21 which is illustrated in the timing diagram of FIG. 10 as the R4 pulse. Thus, operation of the system of FIG. 2 for each incremental movement of the electron beam to display one increment of movement is based on the clock pulse C from the data processor 21. The timing control 40 has a settling delay one-shot which is responsive to the trailing edge of the clock pulse and provides time, shown for example in FIG. 10 as 2½ micro seconds, for the digital-to-analog circuitry to settle. At the trailing edge of the settling delay one-shot the variable intensity control circuit 48 provides a pulse to unblank the electron beam for a minimum of 33 nanoseconds and a maximum of 7100 nanoseconds. The register flip-flops X, Y, Z are conditioned in response to the trailing edge of the clock pulse. Thus, the electron beam is unblanked after the X and Y deflection voltages have deflected the beam the desired increment.

The illustrated embodiments of the invention show a digital data processor having a particular incremental command signal which is applied to the cathode ray tube 31 to deflect the electron beam by a differential vector from the last position. It is to be realized that the data processor 21 may have different command structure and may be either a general purpose digital computer or an off-line system such as a magnetic tape. Also, it is to be realized that the exact counts of the registers may be any desired amount in accordance with the scale factor desired.

Having shown the general nature of the preferred aspect of the instant invention and its modes of operation, it is apparent that a number of distinctive and important advantages over prior art cathode ray tube display devices will be found in the practice of this invention. Complete compatibility, flexibility, and versatility in operation with a digital computer is provided by the incremental control whereby the electron beam is moved one increment at a time in accordance with one command from the data processor 21. The digital intensity control provided by the invention provides a uniform intensity of the display on the screen. The number of circuits is simplified. The only precision control necessary is that in accordance with standard cathode ray tube deflection system design. The system may use a standard cathode ray tube for display purposes and it is readily adaptable to improved or special purpose tubes or other display devices as desired. The system is adaptable to display any type of information, discontinuous or continuous, characters, lines or pictures by the simple expedient of providing an appropriate selection of commands from the data processor 21. The intensity control provides a versatility, flexibility, and uniform intensity.

Although the preferred embodiment of the present invention has been shown and described herein, it is to be understood that the invention is not to be limited thereto, for it is susceptible to changes in form and detail within the scope of the appended claims.

We claim:

1. A system for providing graphical records on a display device comprising a cathode ray tube having X and Y deflection means for deflecting the electron beam of said tube, apparatus for generating signals to deflect said electron beam to select dot positions for forming a display on said tube, each said dot position corresponding to an incremental plotting step, said apparatus including: means for storing a command indicative of a combination of differentially valued sequences of instructions for defining the incremental plotting steps from an origin, each incremental plotting step indicated by said command being initiated from the location of termination of the last previous plotting step; means responsive to said stored command for controlling said deflection means to deflect said electron beam, while blanked, to said selected dot positions in accordance with said sequences of instructions; and means responsive to said stored command for unblanking said beam after deflection to a selected dot position to form a dot on the face of the cathode ray tube at said selected dot position.

2. The graphical recording system recited in claim 1 including means responsive to said stored command for incrementally correcting the intensity of said electron beam at a selected dot position in accordance with the direction of displacement of the beam from the last position to said selected dot position.

3. The graphical recording system recited in claim 1 wherein said command storing means comprises means for storing data and providing successive sets of digital incremental instructions, each incremental instruction set including arbitrary X, Y and Z plot axis instructions, said means for controlling said deflection means including an X axis register coupled to said command storing means to receive X axis instructions, a Y axis register coupled to said command storing means to receive Y axis instructions, an X register ladder coupled to said X axis register to provide analog voltages indicative of said X axis instructions, a Y register ladder coupled to said Y axis register to provide voltages indicative of said Y axis instructions, the output of said X register ladder coupled to said deflection means to deflect said electron beam along the X coordinate axis, the output of said Y register ladder coupled to said deflection means to deflect said electron beam along the Y coordinate axis.

4. The graphical recording system recited in claim 3 wherein said means for varying the intensity of said electron beam includes a Z axis register coupled to said command storing means to receive Z axis instructions, intensity control means coupled to said Z axis register to provide signals indicative of said Z axis instructions, the output of said intensity control connected to said cathode ray tube to vary the intensity of said electron beam in accordance with said Z instruction sequences.

5. The graphical recording system recited in claim 3 wherein each X and Y instruction sequence is indicative of an incremental movement of predetermined length.

6. The graphical recording system recited in claim 4 wherein each Z instruction sequence is indicative of an intensity level.

7. The graphical recording system recited in claim 2 wherein said means responsive to said stored command for incrementally correcting the intensity of said electron beam increases the intensity by the square root of two for dot positions along a diagonal direction.

8. The graphical recording system recited in claim 2 wherein said intensity correcting means provides a predetermined beam intensity for selected dot positions along one or the other of the X or Y axes of said deflection means and a greater beam intensity for dot positions along both of the X and Y axes.

9. The graphical recording system recited in claim 2 wherein said intensity correcting means provides a beam of predetermined intensity for a selected dot position along one of said deflection axes and a beam of different intensity for a selected dot position along both of said deflection axes.

10. The graphical recording system recited in claim 1 wherein commands corresponding to programmed intensity changes may be stored in said storing means, means responsive to said stored intensity change commands for incrementally varying the intensity of said electron beam in accordance with said programmed intensity changes.

11. The graphical recording system recited in claim 10 wherein said means responsive to said stored intensity change commands incrementally corrects the intensity level of the electron beam in accordance with the position of the previously commanded dot position.

12. The graphical recording system recited in claim 10 wherein said means responsive to said stored intensity change commands incrementally corrects the beam to a predetermined intensity level when the previously commanded dot position was along one or the other of the X or Y axes of said deflection means and to a different intensity level when the previously commanded dot position was along both the X and Y axes.

13. A system for providing graphical records on a display device comprising a cathode ray tube and means for deflecting the electron beam of said tube, means for storing digitally encoded signals corresponding to incremental plotting steps, means responsive to said storing means for incrementally deflecting said electron beam to select positions for forming dots on the face of the cathode ray tube in accordance with said plotting steps for providing the display on said tube, and means responsive to said storing means for automatically incrementally correcting the intensity of said electron beam at each selected dot position in accordance with the direction of displacement of the beam from the last position to said selected dot position.

References Cited

UNITED STATES PATENTS

| | | | |
|---|---|---|---|
| 3,320,409 | 5/1967 | Larrowe | 340—172.5 |
| 3,325,802 | 6/1967 | Bacon | 340—324 |
| 3,325,803 | 6/1967 | Carlock | 340—324 |
| 3,334,304 | 8/1967 | Fourwier et al. | 340—324 |

JOHN W. CALDWELL, Primary Examiner

MARSHALL M. CURTIS, Assistant Examiner

U.S. Cl. X.R.

315—22